United States Patent
Chen et al.

(10) Patent No.: US 12,346,364 B2
(45) Date of Patent: Jul. 1, 2025

(54) SYSTEM AND METHOD FOR CLASSIFYING TEXTUAL DATA BLOCKS

(71) Applicant: GENESYS CLOUD SERVICES, INC., Menlo Park, CA (US)

(72) Inventors: Joy Chen, Menlo Park, CA (US); Igal Mazor, Tel-Aviv (IL)

(73) Assignee: Genesys Cloud Services, Inc., Menlo Park, CA (US)

( * ) Notice: Subject to any disclaimer, the term of this patent is extended or adjusted under 35 U.S.C. 154(b) by 81 days.

(21) Appl. No.: 18/087,069

(22) Filed: Dec. 22, 2022

(65) Prior Publication Data

US 2024/0211503 A1  Jun. 27, 2024

(51) Int. Cl.
*G06F 16/35* (2025.01)
*G06F 16/353* (2025.01)
*G06N 3/08* (2023.01)

(52) U.S. Cl.
CPC .............. *G06F 16/353* (2019.01); *G06N 3/08* (2013.01)

(58) Field of Classification Search
CPC .... G06F 16/353; G06F 40/205; G06F 40/268; G06F 40/30; G06F 40/279; G06N 3/08; G06N 3/0895; G06N 3/09; G06N 3/091; G06N 3/092; G06N 3/094; G06N 3/096; G06N 3/098; G06N 3/0985
See application file for complete search history.

(56) References Cited

U.S. PATENT DOCUMENTS

| | | | |
|---|---|---|---|
| 2008/0022308 A1* | 1/2008 | Garcea | H04N 21/47 725/39 |
| 2012/0159550 A1* | 6/2012 | Bajpai | H04N 21/482 725/44 |
| 2013/0173533 A1* | 7/2013 | Nichols | G06F 16/437 707/E17.005 |
| 2014/0075310 A1* | 3/2014 | Li | G11B 27/34 715/716 |
| 2017/0161372 A1* | 6/2017 | Fernández | G06F 40/211 |
| 2020/0104710 A1* | 4/2020 | Vasudevan | G06N 3/045 |
| 2022/0043836 A1* | 2/2022 | Upadhyay | G06N 20/00 |
| 2023/0022845 A1* | 1/2023 | Meng | G06F 40/279 |

* cited by examiner

*Primary Examiner* — Kavita Stanley
*Assistant Examiner* — Cecile H Vo
(74) *Attorney, Agent, or Firm* — Taft Stettinius & Hollister LLP

(57) ABSTRACT

A method and a system of classifying textual data blocks are claimed. The method includes receiving at least one textual data block in an original version, including a plurality of textual data elements; performing a preprocessing procedure on the at least one textual data block in the original version, wherein the preprocessing procedure includes replacing the textual data elements characterized by pertinence to at least one specific part-of-speech (POS) category with a respective POS token, thereby obtaining the at least one textual data block in a preprocessed version; inferring a pretrained ML-based model on the at least one textual data block in the preprocessed version, to classify the at least one textual data block by pertinence to the at least one class.

18 Claims, 6 Drawing Sheets

S1005: Receiving at least one textual data block in an original version, comprising a plurality of textual data elements.

S1010: Performing a preprocessing procedure on the at least one textual data block in the original version, wherein the preprocessing procedure comprises replacing the textual data elements characterized by pertinence to at least one specific part-of-speech (POS) category with a respective POS token, thereby obtaining the at least one textual data block in a preprocessed version.

S1015: Inferring a pretrained ML-based model on the at least one textual data block in the preprocessed version, to classify the at least one textual data block by pertinence to the at least one class.

SYSTEM AND METHOD FOR CLASSIFYING TEXTUAL DATA BLOCKS

FIELD OF THE INVENTION

The present invention relates generally to machine learning (ML) and artificial intelligence (AI). More specifically, the present invention relates to aspects of textual data preprocessing that comes in advance to applying ML and AI techniques thereon.

BACKGROUND OF THE INVENTION

As known, development of mathematical models that can learn from, and make predictions on data is a general purpose of machine learning. In particular, supervised and semi-supervised machine learning includes model training using so-called "training dataset" (or "supervisory dataset") and testing using "inference dataset". The term "training dataset" is commonly referred to a set of annotated data samples (also called in the context of this application as "data blocks"), wherein annotations provide associations of the data samples with a plurality of classes (in case of classification ML tasks). In other words, annotated data samples represent pairs of input and output vectors (or scalars) for a machine-learning model. The ML-based model iteratively analyzes data samples of a training dataset to produce a result, which is then compared with a target result—corresponding annotations of data samples in the training dataset. Based on the comparison, a supervised learning algorithm determines the optimal combinations of model variables that will provide the highest prediction reliability. In the end, well-trained models must show sufficiently reliable results when analyzing unknown data.

Creating vector representation of data samples (also called "embedding into a vector space") usually involves defining data samples through a set of features having countable values. Choosing a set of features is reasonably considered a crucial aspect of machine learning. In the case of classification tasks, it is of the highest importance to reveal features that distinctly represent similarities and dissimilarities between target classes.

Therefore, the importance of data preprocessing that comes in advance to applying ML and AI techniques and that is directed to revealing such features shall not be underestimated. Data preprocessing often includes steps directed to a generalization of data samples representation in scope of their structure or content, thereby giving a key to revealing important distinctive features. For example, in relation to image analysis, the preprocessing may be directed to determining edges of objects and thus assist in emphasizing shape-related features and ignoring color-related. Furthermore, such generalization leads to significant reduction of data samples diversity which, in turn, may dramatically increase prediction reliability.

The process of choosing the preprocessing approach is intricate and often even insignificant changes in this approach (e.g., the sequence of incorporated steps) may significantly affect the performance of the trained ML-based model.

Natural language processing (NLP) tasks also strongly depend on the efficiency of applied data preprocessing techniques. For example, the task of automatic signature block extraction in email in order to keep only meaningful text, may be considered to be a task of such a type. This task involves ML-based classification of textual data blocks aimed at finding signature-related ones.

It is problematic to perform such classification reliably, since even though there are some similarities uniting the entire diversity of signature block representations, there are no exact standards applied to or features necessarily present in such blocks. In some methods, known in the art, certain predefined features are used, e.g., features indicating whether any line of a textual block contains an URL link or sender's name (e.g., taken from sender's email address), which is further used for supervising ML to extract signature block. However, such methods fail to provide classification when there is no sender's information present, consequently they are not reliable enough for commercial usage.

SUMMARY OF THE INVENTION

Accordingly, there is a need for a ML-based system and method for classifying textual data blocks, which would incorporate an improved textual data preprocessing stage, thus providing technical improvement by increasing reliability of ML-based textual data blocks classification.

To overcome the shortcomings of the prior art, the following invention is provided.

In the general aspect, the invention may be directed to a method of classifying textual data blocks by at least one processor, the method including receiving at least one textual data block in an original version, including a plurality of textual data elements: performing a preprocessing procedure on the at least one textual data block in the original version, wherein the preprocessing procedure includes replacing the textual data elements characterized by pertinence to at least one specific part-of-speech (POS) category with a respective POS token, thereby obtaining the at least one textual data block in a preprocessed version; inferring a pretrained ML-based model on the at least one textual data block in the preprocessed version, to classify the at least one textual data block by pertinence to the at least one class.

In another general aspect, the invention may be directed to a system for classifying textual data blocks, the system including: a non-transitory memory device, wherein modules of instruction code are stored, and at least one processor associated with the memory device, and configured to execute the modules of instruction code, whereupon execution of said modules of instruction code, the at least one processor is configured to: receive at least one textual data block in an original version, including a plurality of textual data elements: perform a preprocessing procedure on the at least one textual data block in the original version, wherein the preprocessing procedure includes replacing the textual data elements characterized by pertinence to at least one specific part-of-speech (POS) category with a respective POS token, thereby obtaining the at least one textual data block in a preprocessed version; and infer a pretrained ML-based model on the at least one textual data block in the preprocessed version, to classify the at least one textual data block by pertinence to the at least one class.

In some embodiments, the at least one specific POS category may be a "proper noun" category; and preprocessing procedure further may include defining the textual data elements as pertaining to "proper noun" category.

In some embodiments, the preprocessing procedure may further include replacing the textual data elements characterized by presence of specific character or sequence of characters with a respective character-based token.

In some embodiments, replacing the textual data elements characterized by presence of specific character or sequence of characters with a respective character-based token may be performed prior to replacing the textual data elements characterized by pertinence to the at least one specific POS category with the respective POS token.

In some embodiments, the specific character or sequence of characters may be character or sequence of characters specific for at least one of: an email address, an alphanumeric or numeric code, and a Uniform Resource Locator (URL).

In some embodiments, the preprocessing procedure may further include replacing the textual data elements characterized by specific contextual definition with a respective context-based token.

In some embodiments, replacing the textual data elements characterized by specific contextual definition with a respective context-based token may be performed prior to replacing the textual data elements characterized by pertinence to the at least one specific POS category with the respective POS token and after replacing the textual data elements characterized by presence of specific character or sequence of characters with a respective character-based token.

In some embodiments, the specific contextual definition may represent definition of the textual data elements as pertaining to "named entity" category.

In some embodiments, the at least one textual data block may include textual data elements arranged in at least one line: and the method may further include preliminary classifying the at least one textual data block by pertinence to the at least one class, based on a length of the at least one line of the textual data elements.

In some embodiments, the preprocessing procedure may further include embedding the at least one textual data block into a vector space.

In some embodiments, embedding the at least one textual data block into a vector space may include creating a vector representation of each textual data element based on term frequency-inverse document frequency (TF-IDF) measure.

In some embodiments, the pretrained ML-based model may be pretrained so as to classify the at least one textual data block by pertinence to the at least one class, based on the preprocessed version of the at least one textual data block.

In some embodiments, the method may further include training the ML-based model to classify textual data blocks by pertinence to at least one class, based on the preprocessed version of the at least one textual data block.

In some embodiments, training the ML-based model may include forming a training dataset, including the at least one textual data block in the preprocessed version labeled with indication of pertinence to the at least one class: and training the ML-based model to classify textual data blocks by pertinence to at least one class, based on the training dataset.

In some embodiments, the at least one textual data block may represent paragraph and the textual data elements represent words.

In some embodiments, the at least one textual data block may represent an email section and the at least one class may represent pertinence of the textual data block to an email signature section.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
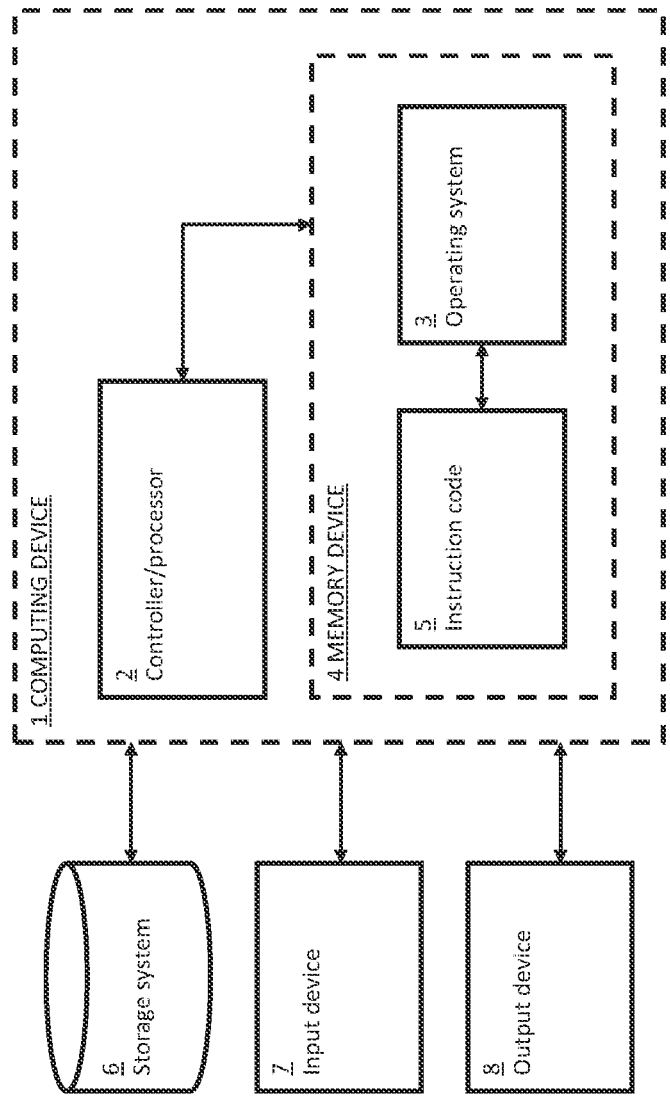
FIG. 1 is a block diagram, depicting a computing device which may be included in a system for classifying textual data blocks, according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", "choosing", "selecting", "omitting", "training" or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items.

Unless explicitly stated, the method embodiments described herein are not constrained to a particular order or sequence. Additionally, some of the described method embodiments or elements thereof can occur or be performed simultaneously, at the same point in time, concurrently, or iteratively and repeatedly.

In some embodiments of the present invention, ML-based model may be an artificial neural network (ANN).

A neural network (NN) or an artificial neural network (ANN), e.g., a neural network implementing a ML or AI function, may refer to an information processing paradigm that may include nodes, referred to as neurons, organized into layers, with links between the neurons. The links may transfer signals between neurons and may be associated with weights. A NN may be configured or trained for a specific task, e.g., textual data block recognition or classification. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. A processor, e.g., CPUs or graphics processing units (GPUs), or a dedicated hardware device may perform the relevant calculations.

It should be obvious for the one ordinarily skilled in the art that various ML-based models can be implemented without departing from the essence of the present invention. It should also be understood, that in some embodiments ML-based model may be a single ML-based model or a set (ensemble) of ML-based models realizing as a whole the same function as a single one. Hence, in view of the scope of the present invention, the abovementioned variants should be considered equivalent.

In some respects, the following description of the claimed invention is provided with respect to the task of email signature block classification and extraction. Such a specific purpose and embodiments of the invention directed to it are provided in order for the description to be sufficiently illustrative and they are not intended to limit the scope of protection claimed by the invention. It should be understood for one ordinarily skilled in the art that the implementation of the claimed invention in accordance with such a task is provided as a non-exclusive example and other practical implementations can be covered by the claimed invention, such as any implementations utilizing the claimed method of classifying textual data blocks regardless of whether the purpose of such classification is related to email processing, or it is related to different tasks.

The concept of the claimed invention lies in that, in the ML-based textual data classification evaluation of textual data structure aspects is very important. Some classification tasks are even more structure-than content-dependent. E.g., as mentioned above, email signature blocks have such a diversity in content that makes content-based approaches unapplicable in view of low performance reliability. However, email signature blocks have very specific structure, which is normally never applied in other types of textual data blocks (e.g., email body or greeting section). The reasonable way of assessing textual data block structure is to consider them as a specific sequence pattern of textual data elements of different lexical categories (parts of speech). Obviously, there are variations in such patterns as well, but ML methods may effectively reveal similarities between signature-related textual data samples and provide ML-based model capable of performing reliable recognition of them.

Reference is now made to FIG. 1, which is a block diagram depicting a computing device, which may be included within an embodiment of the system for classifying textual data blocks, according to some embodiments.

Computing device 1 may include a processor or controller 2 that may be, for example, a central processing unit (CPU) processor, a chip or any suitable computing or computational device, an operating system 3, a memory device 4, instruction code 5, a storage system 6, input devices 7 and output devices 8. Processor 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to instruction code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory device 4 may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short-term memory unit, a long-term memory unit, or other suitable memory units or storage units. Memory device 4 may be or may include a plurality of possibly different memory units. Memory device 4 may be a computer or processor non-transitory readable medium, or a computer non-transitory storage medium, e.g., a RAM. In one embodiment, a non-transitory storage medium such as memory device 4, a hard disk drive, another storage device, etc. may store instructions or code which when executed by a processor may cause the processor to carry out methods as described herein.

Instruction code 5 may be any executable code, e.g., an application, a program, a process, task, or script. Instruction code 5 may be executed by processor or controller 2 possibly under control of operating system 3. For example, instruction code 5 may be a standalone application or an API module that may be configured to train or infer ML-based model as further described herein. Although, for the sake of clarity, a single item of instruction code 5 is shown in FIG. 1, a system according to some embodiments of the invention may include a plurality of executable code segments or modules similar to instruction code 5 that may be loaded into memory device 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Various types of input and output data may be stored in storage system 6 and may be loaded from storage system 6 into memory device 4 where it may be processed by processor or controller 2. In some embodiments, some of the components shown in FIG. 1 may be omitted. For example, memory device 4 may be a non-volatile memory having the storage capacity of storage system 6. Accordingly, although shown as a separate component, storage system 6 may be embedded or included in memory device 4.

Input devices 7 may be or may include any suitable input devices, components, or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., similar to element 2), a plurality of input units, a plurality of output units, a plurality of memory units, and a plurality of storage units.

Figure 2A:
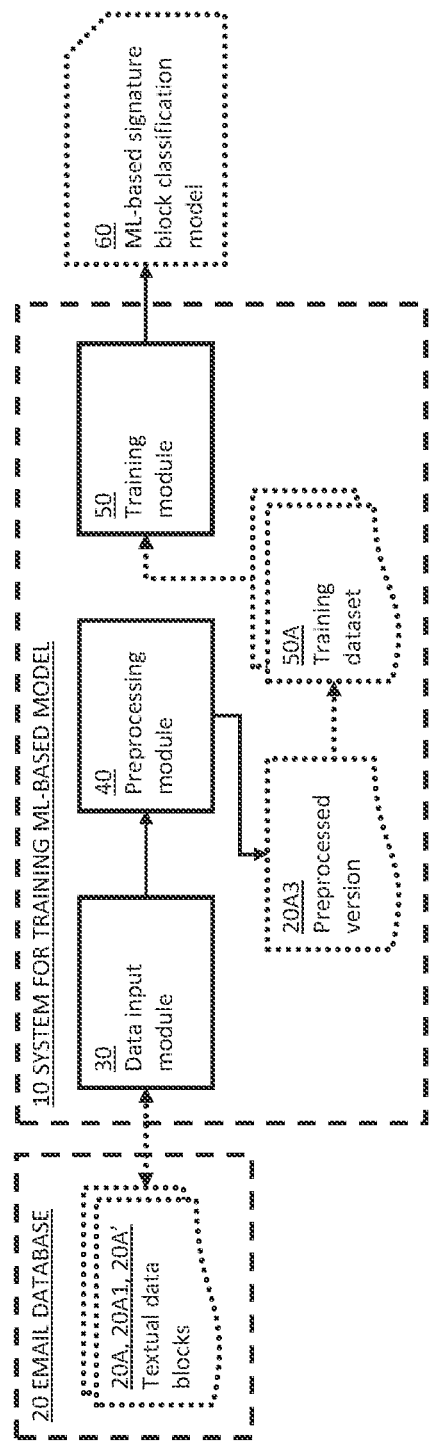
FIG. 2A is a block diagram, depicting a system for training ML-based model to classify textual data blocks, according to some embodiments.
Figure 2B:
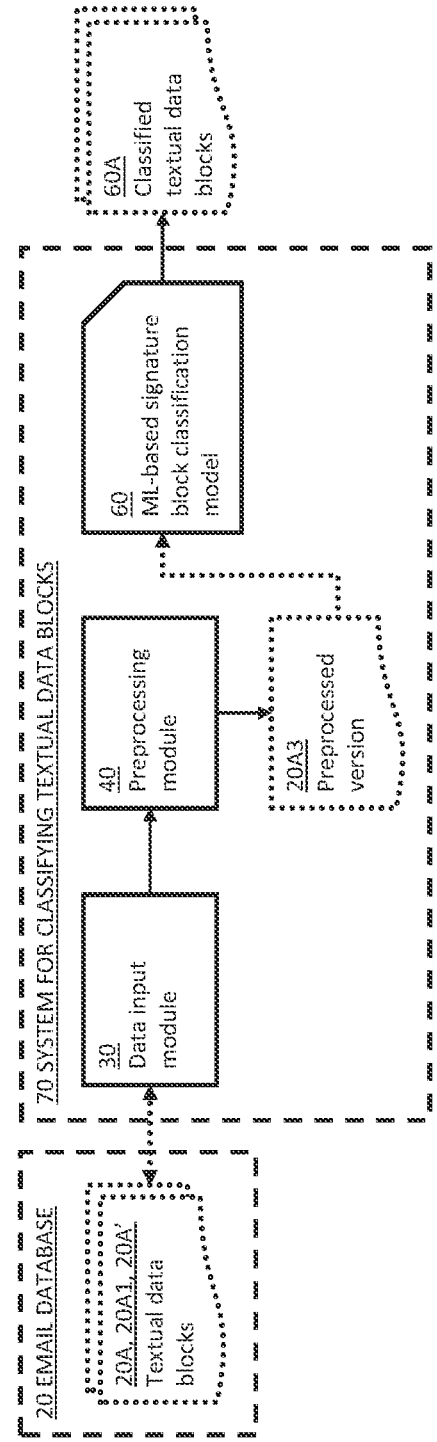
FIG. 2B is a block diagram, depicting a system for classifying textual data blocks, according to some embodiments.

Reference is now made to FIGS. 2A and 2B, which depict system 10 for training ML-based model to classify textual data blocks 20A and system 70 for classifying textual data blocks 20A, according to some embodiments.

According to some embodiments of the invention, systems 10 and 70 may be implemented as software modules, hardware modules, or any combination thereof. For example, systems 10 and 70 may be or may include a computing device such as element 1 of FIG. 1. Furthermore, systems 10 and 70 may be adapted to execute one or more modules of instruction code (e.g., element 5 of FIG. 1) to request, receive, analyze, calculate and produce various data. As further described in detail herein, systems 10 and 70 may be adapted to execute one or more modules of instruction code (e.g., element 5 of FIG. 1) in order to receive textual data blocks 20A in original version 20A1, perform a preprocessing procedure on received textual data blocks 20A, thereby obtaining textual data blocks 20A in preprocessed version 20A3, train and infer a ML-based model (e.g., ML-based signature block classification model 60) on textual data blocks 20A in the preprocessed version 20A3, to classify textual data blocks 20A by pertinence to a predefined set of classes etc.

As shown in FIGS. 2A and 2B, arrows may represent flow of one or more data elements to and from systems 10 and 70 and/or among modules or elements of systems 10 and 70. Some arrows have been omitted in FIGS. 2A and 2B for the purpose of clarity.

In some embodiments, systems 10 and 70 may include identical modules, therefore, for the purpose of clarity, such modules have same numerical references.

In some embodiments, systems 10 and 70 may include data input module 30. Data input module 30 may be configured to receive textual data blocks (textual data blocks 20A from email database 20) in an original version 20A1. Each textual data block 20A may comprise a plurality of textual data elements 20A'.

In some embodiments, each textual data block 20A may represent paragraph and textual data elements 20A' may represent words.

In some embodiments, systems 10 and 70 may include preprocessing module 40. Preprocessing module 40 may be configured to perform a preprocessing procedure on the received textual data blocks 20A in the original version 20A1. Preprocessing module 40 may be further configured to obtain textual data blocks 20A in preprocessed version 20A3.

Aspects of preprocessing module 40 and the preprocessing procedure are described in detail with reference to FIGS. 3 and 4.

In some embodiments, system 10 may be further configured to form training dataset 50A. Training dataset 50A may include textual data blocks 20A in preprocessed version 20A3 labeled with indication of pertinence to one of the predefined classes. In some embodiments, textual data blocks 20A may represent email sections (e.g., greeting section, body section, signature section etc.) and one of the predefined classes may represent pertinence of textual data blocks 20A to an email signature section class.

In some embodiments, system 10 may further include training module 50. Training module 50 may be configured to receive training dataset 50A. Training module 50 may be further configured to train ML-based model (e.g., ML-based signature block classification model 60) to classify textual data blocks 20A by pertinence to the predefined classed, based on training dataset 50A (i.e., based on preprocessed versions 20A3 of textual data blocks 20A).

In some embodiments, system 70 may further include the pretrained ML-based model (e.g., ML-based signature block classification model 60), which is pretrained so as to classify textual data blocks 20A by pertinence to the predefined classes, based on preprocessed version 20A3 of textual data blocks 20A. ML-based signature block classification model 60 may be further configured to receive preprocessed version 20A3 of textual data blocks 20A. System 70 may be further configured to infer pretrained ML-based signature block classification model 60 on textual data blocks 20A in preprocessed version 20A3, to classify textual data blocks 20A by pertinence to the predefined classes. ML-based signature block classification model 60 may be further configured to output classified textual data blocks 60A.

In some embodiments, with respect to email signature section classification, system 70 may be additionally configured to preliminary classify textual data blocks 20A by pertinence to the predefined classes, based on a length of the at least one line of textual data elements 20A. Since textual data elements are generally arranged in lines and signature section usually has lines shorter than other email sections, such a preliminary classification may provide additional technical improvement by increasing reliability of overall prediction maid by system 70.

Figure 3:
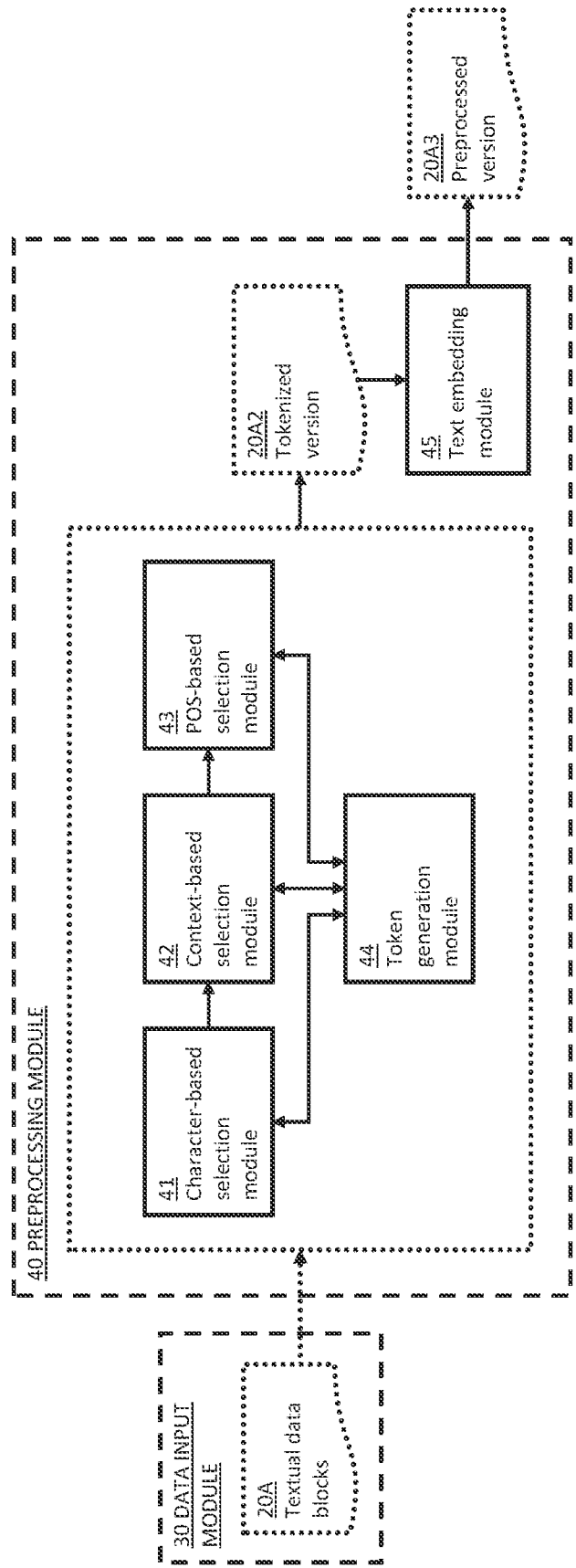
FIG. 3 is a block diagram, depicting a preprocessing module included in a system for training ML-based model and system for classifying textual data blocks, according to some embodiments.
Figure 4:
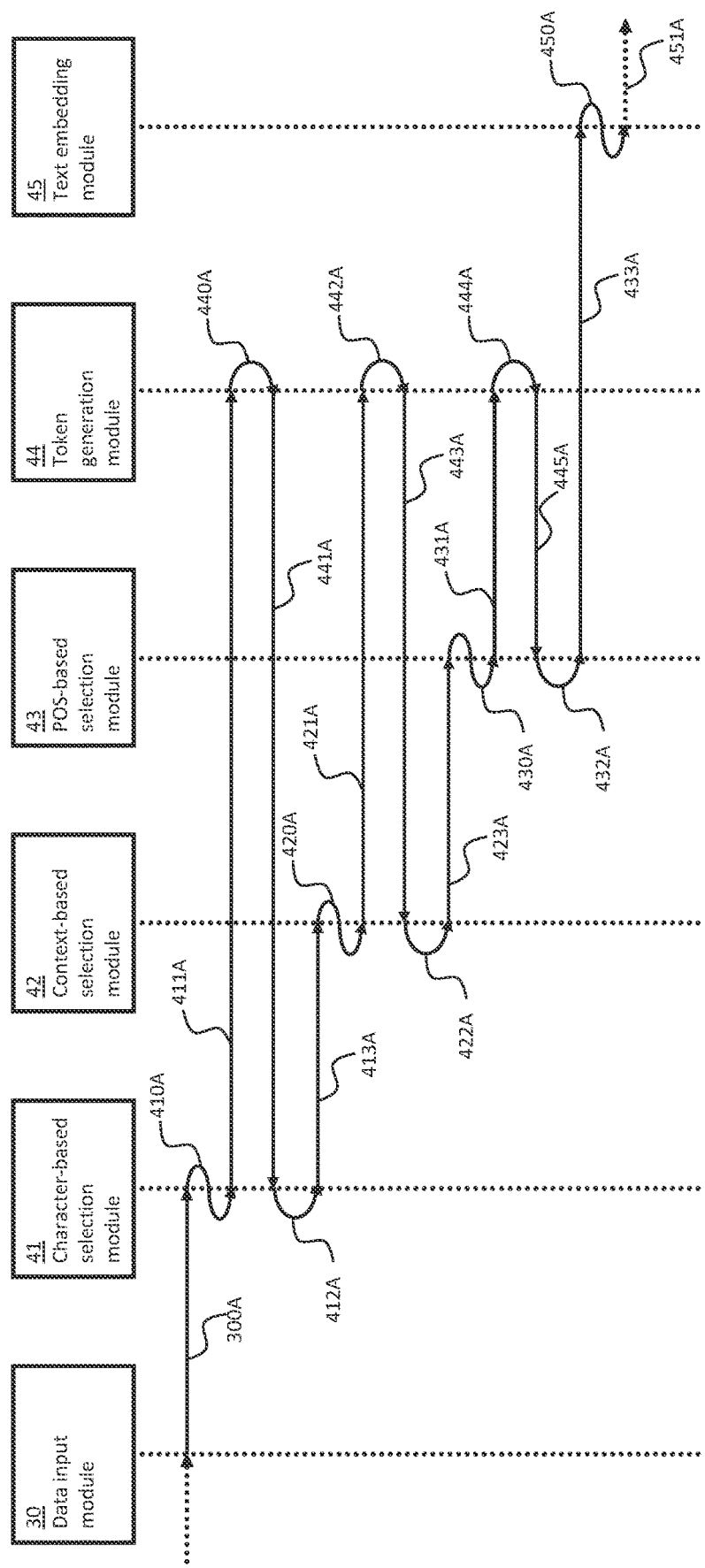
FIG. 4 is a sequence diagram, depicting a sequence of data preprocessing and transmission steps made by the preprocessing module.

Reference is now made to FIGS. 3 and 4. FIG. 3 depicts preprocessing module 40 included in system 10 for training ML-based model (e.g., ML-based signature block classification model 60) and system 70 for classifying textual data blocks 20A, according to some embodiments. FIG. 4 depicts sequence of data preprocessing and transmission steps made by preprocessing module 40, according to some embodiments.

In some embodiments, preprocessing module 40 may include character-based selection module 41, context-based selection module 42, POS-based selection module 43, token generation module 44 and text embedding module 45.

Data input module 30 may be configured to perform transmission 300A of textual data blocks 20A to character-based selection module 41.

Character-based selection module 41 may be configured to perform selection 410A of textual data elements 20A' characterized by presence of specific character or sequence of characters. In some embodiments, the specific character or sequence of characters may be a character or sequence of characters specific for an email address (e.g., character "(@)"), an alphanumeric or numeric code (e.g., combination of symbols "-" and "( )" with numerals, giving common pattern of a phone number, like "(123)1234-123" etc.), and a Uniform Resource Locator (URL) (e.g., "http://www"). In some embodiments, character-based selection may be performed by using string-searching algorithms known in the art, e.g., by using regular expressions.

In some embodiments, character-based selection module 41 may be further configured to perform selection of commonly used signature section separating symbols (within selection 410A or separately), e.g., "***", "-", etc. In some embodiments, character-based selection module 41 may be further configured to perform selection of non-printable characters (within selection 410A or separately), e.g., spaces between textual data elements 20A', line breaks, etc. In some embodiments, character-based selection module 41 may be further configured to perform selection of common signature greetings (within selection 410A or separately), e.g., "Best regards", "Thanks" etc.

Character-based selection module 41 may be further configured to perform transmission 411A of the selected at stage 410A textual data elements 20A' (or any kind of reference directing to these elements) to token generation module 44. Token generation module 44 may be further configured to perform generation 440A of respective character-based tokens to replace textual data elements 20A' characterized by presence of specific character or sequence of characters.

Token may represent respective keyword, unambiguously recognizable by systems 10 or 70, or components thereof, as an indicator of specific type of textual data elements 20A', which it represents. E.g., tokens for email, phone number and URL may have the following representations: "EMAIL_TOKEN", "PHONE_NUMBER_TOKEN" and "URL_TOKEN" respectively.

Token generation module 44 may be further configured to perform transmission 441A of generated tokens to character-based selection module 41. Character-based selection module 41 may be further configured to perform replacement 412A of textual data elements 20A' characterized by presence of specific character or sequence of characters with respective character-based tokens. Character-based selection module 41 may be further configured to perform transmission 413A of the partially tokenized version (i.e., version obtained after replacement 412A) of textual data block 20A to context-based selection module 42.

Context-based selection module 42 may be configured to perform selection 420A of textual data elements 20A' characterized by specific contextual definition.

In some embodiments, the specific contextual definition may represent definition of textual data elements 20A' as pertaining to "named entity" category. In this description, the term "contextual definition" means specific function of textual data element 20A', wherein the function may be unambiguously understood only by being considered within the respective context. For example, textual data element representing title of the company, such as "The New York Times", may be easily confused with a part of the address, if not considered within the respective context.

"Named entity" category may represent person's name, organization name etc. In some embodiments, context-based selection in general and selection with respect to "named entity" category in particular may be performed by known in the art ML-based techniques, e.g., Named Entity Recognition (NER) techniques.

Context-based selection module 42 may be further configured to perform transmission 421A of the selected at stage 420A textual data elements 20A' (or any kind of reference directing to these elements) to token generation module 44. Token generation module 44 may be further configured to perform generation 442A of respective context-based tokens to replace textual data elements 20A' characterized by specific contextual definition.

Token generation module 44 may be further configured to perform transmission 443A of generated tokens to context-based selection module 42. Context-based selection module 42 may be further configured to perform replacement 422A of textual data elements 20A' characterized by specific contextual definition with a respective context-based tokens. Context-based selection module 42 may be further configured to perform transmission 423A of a partially tokenized version of textual data block 20A (i.e., version obtained after replacements 412A and 422A in the specified order) to POS-based selection module 43.

POS-based selection module 43 may be configured to perform selection 430A of textual data elements 20A' characterized by pertinence to specific POS categories. In some embodiments, specific POS category may represent "proper noun" category: and preprocessing procedure may further comprise defining textual data elements 20A' as pertaining to "proper noun" category. "Proper noun" is the most frequently used and specific POS category for signature blocks, hence, choosing this category as a feature for signature section classification would be more effective than choosing other POS categories. Nevertheless, it should be clear to the one ordinarily skilled in the art that other POS categories, e.g., verbs, adjectives, nouns (in general), might be used in addition, providing additional technical improvement of increasing prediction reliability.

Selection 430A of textual data elements 20A' characterized by pertinence to specific POS categories may be performed by using either deterministic or statistical computational methods known from the prior art. E.g., the deterministic methods may include determining and selecting textual data elements 20A' of "proper noun" category based on presence of capital letters therein. Statistical methods may in turn include common ML-based classification methods.

POS-based selection module 43 may be further configured to perform transmission 431A of the selected at stage 430A textual data elements 20A' (or any kind of reference directing to these elements) to token generation module 44. Token generation module 44 may be further configured to perform generation 444A of respective POS-based tokens to replace textual data elements 20A' characterized by pertinence to specific POS categories.

Token generation module 44 may be further configured to perform transmission 445A of generated tokens to POS-based selection module 43. POS-based selection module 43 may be further configured to perform replacement 432A of textual data elements 20A' characterized by pertinence to specific POS categories with a respective POS-based tokens. POS-based selection module 43 may be further configured to perform transmission 433A of textual data blocks 20A in tokenized version 20A2 (i.e., version of textual data blocks 20A obtained after replacements 412A, 422A and 432A in the specified order) to text embedding module 45.

In some embodiments, text embedding module 45 may be configured to perform embedding 450A of textual data blocks 20A in tokenized version 20A2 into a vector space. It should be clear to the one ordinarily skilled in the art that embedding 450A is a common procedure of known ML and AI techniques applied to NLP tasks and that embedding 450A may be performed by known methods. E.g., embedding 450A may be performed by creating a vector representation of each textual data element 20A' and token based on term frequency-inverse document frequency (TF-IDF) measure.

More particularly, embedding 450A may include calculating, per each textual data element 20A' and token, term frequency (TF) as a number of times respective textual data element 20A' or token occurs in respective textual data block 20A (e.g., respective paragraph of an email) divided by the total number of textual data elements 20A' and tokens together (counting each occurrence of the same textual data element 20A' or token separately). Embedding 450A may further include calculating, per each email, inverse document frequency (IDF) as a logarithmically scaled result obtained by division of a total number of paragraphs (i.e., textual data blocks 20A in tokenized version 20A2) in the respective email by a number of paragraphs containing the respective textual data element 20A' or token. Then, TF-IDF measure may be calculated as multiplication of respective TF and IDF values. Hence, a vector representation of each paragraph (i.e., obtained preprocessed version 20A3 of each textual data block 20A) may be defined through a set of features, wherein the set of features may include a complete list of textual data elements 20A' and tokens contained in all textual data blocks 20A, that form a training dataset 50A. For each training example (each specific textual data block 20A) in training dataset 50A, value of each feature may represent TF-IDF measure calculated with respect to this textual data block 20A, giving each specific textual data block 20A its unique vector representation.

The abovementioned TF-IDF measure provides representation of textual data block 20A with respect to email that contains it. It should be understood by the one ordinarily skilled in the art that such representation is provided as a non-exclusive example. E.g., in alternative embodiments, IDF may be calculated as a logarithmically scaled result obtained by division of a total number of paragraphs (i.e., textual data blocks 20A) in training dataset 50A by a number of paragraphs containing the respective textual data element 20A' or token. In yet another alternative embodiment, IDF may be calculated as a logarithmically scaled result obtained by division of a total number of paragraphs (i.e., textual data blocks 20A) in respective class (e.g., class representing email signature section, class representing email body section etc.) of training dataset 50A by a number of paragraphs containing the respective textual data element 20A' or token.

Text embedding module 45 may be further configured to perform transmission 451A of textual data blocks 20A in preprocessed version 20A3 to other elements of system 10 or 70, as described with respect to FIGS. 2A and 2B.

It should be noted that, according to the described embodiments, classification of textual data blocks 20A is performed considering each textual data block 20A as a whole. Such an approach also provides technical improvement of increasing ML-based model (e.g., ML-based signature block classification model 60) reliability, if compared to sentence-based approaches known in the art.

As indicated above, in embodiments of the claimed preprocessing procedure, the importance of sequence of actions shall be considered thoroughly. In some embodiments, even insignificant alteration in the sequence may affect the performance of system 10 or 70 dramatically.

E.g., in hypothetical case, if replacement 432A of textual data elements 20A' characterized by pertinence to specific POS categories with a respective POS-based tokens is made prior to replacement 422A of textual data elements 20A' characterized by specific contextual definition with a respective context-based tokens, some textual data elements 20A' characterized by specific contextual definition may be missed. In another such example, if within replacement 412A of textual data elements 20A' characterized by presence of specific character or sequence of characters with respective character-based tokens, replacement of regular number related textual data elements 20A' is made prior to the replacement of phone number related textual data elements 20A', some phone number related textual data elements 20A' may be missed.

Hence, the general rule for preferred embodiments of the claimed invention may be to perform replacement of more hardly identifiable textual data elements 20A' prior to replacement of less hardly identifiable ones. The measure of said hardness of identification may be evaluated to some extent by a specialist ordinarily skilled in the art.

In addition, it should be understood that replacements 412A, 422A and 432A of textual data elements 20A' with character-based tokens, context-based tokens and POS-tokens respectively may not be performed in the specified sequence completely. E.g., replacement of phone number related textual data elements 20A' may be made within replacement 412A prior to replacement 422A. However, there may be additional replacement of textual data elements 20A' with character-based tokens (e.g., replacement of regular number related textual data elements 20A') after replacement 422A.

Furthermore, there may be additional technical improvement provided by using replacement of number-related textual data elements 20A' after replacement 422A of textual data elements 20A' characterized by specific contextual definition, in particular, replacement of textual data elements 20A' pertaining to "named entity" category. Since there may be named entities having names that include numbers, in such embodiments, these named entities may be identified correctly, because the included numbers have not been replaced by respective tokens prior to that.

Figure 5:
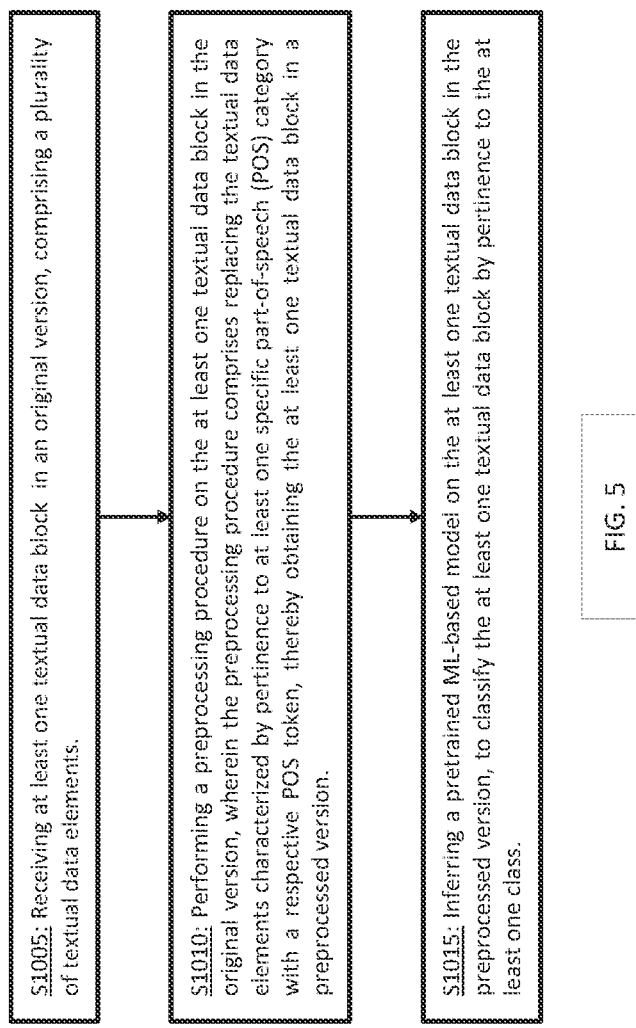
FIG. 5 is a flow diagram, depicting a method of classifying textual data blocks, according to some embodiments.

Referring now to FIG. 5, a flow diagram is presented, depicting a method of classifying textual data blocks, by at least one processor, according to some embodiments.

As shown in step S1005, the at least one processor (e.g., processor 2 of FIG. 1) may perform receiving 200A of the at least one textual data block (e.g., textual data block 20A) in an original version (e.g., original version 20A1), comprising a plurality of textual data elements (e.g., textual data elements 20A'). Step S1005 may be carried out by data input module 30 (as described with reference to FIGS. 2A-2B).

As shown in step S1010, the at least one processor (e.g., processor 2 of FIG. 1) may perform a preprocessing procedure on the at least one textual data block (e.g., textual data block 20A) in the original version (e.g., original version 20A1), wherein the preprocessing procedure comprises replacing 432A the textual data elements (e.g., textual data elements 20A') characterized by pertinence to at least one specific part-of-speech (POS) category with a respective POS token, thereby obtaining the at least one textual data block (e.g., textual data block 20A) in a preprocessed version (e.g., preprocessed version 20A3). Step S1010 may be carried out by preprocessing module 40 (as described with reference to FIGS. 2A-2B and 3).

As shown in step S1015, the at least one processor (e.g., processor 2 of FIG. 1) may perform inferring of a pretrained ML-based model (e.g., ML-based signature block classification model 60) on the at least one textual data block (e.g., textual data block 20A) in the preprocessed version (e.g., preprocessed version 20A3), to classify the at least one textual data block (e.g., textual data block 20A) by pertinence to the at least one class. Step S1015 may be carried out by system 70 (as described with reference to FIG. 2B).

As can be seen from the provided description, the claimed invention represents the ML-based system and method for classifying textual data blocks, which incorporate an improved textual data preprocessing stage, thus providing technical improvement by increasing reliability of ML-based textual data blocks classification.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:
1. A method of classifying textual data blocks by at least one processor, the method comprising:
   receiving textual data blocks in an original version, each of the textual data blocks comprising a plurality of textual data elements;
   performing a preprocessing procedure on each of the textual data blocks in the original version, wherein the preprocessing procedure comprises:
      replacing, for each of the textual data blocks, each of the textual data elements characterized by presence of a specific character or sequence of characters with a respective character-based token to generate a first partial tokenized version of the respective textual data block;
      replacing, for each first partial tokenized version of the textual data blocks, each of the first partial tokenized versions further characterized by a specific contextual definition with a respective context-based token to generate a second partial tokenized version of the respective first partial tokenized first; and
      replacing, for each second partial tokenized version of the textual data blocks, each of the second partial tokenized versions further characterized by pertinence to at least one specific part-of-speech (POS) category with a respective POS token, thereby obtaining, for each of the textual data blocks, the textual data block in a preprocessed tokenized version of the respective textual data block;
   forming a training dataset comprising the textual data blocks in the preprocessed tokenized version labeled with an indication of pertinence to at least once class indicative of an email signature block;
   training a machine learning-based (ML-based) model to classify textual data blocks by pertinence to the at least one class, based on the training dataset, wherein the ML-based model comprises an artificial neural network;
   receiving a new textual data block in an original version, the new textual data block comprising a plurality of textual data elements and performing the preprocessing procedure to obtain, for the new textual data block, the new textual data block in the preprocessed tokenized version;
   performing machine learning, using the trained ML-based model, on the new textual data block in the preprocessed tokenized version to classify the new textual data block by pertinence to the at least one class.

2. The method of claim 1, wherein the at least one specific POS category is "proper noun" category; and the preprocessing procedure further comprises defining the textual data elements as pertaining to a "proper noun" category.

3. The method of claim 1, wherein the specific character or sequence of characters are a character or sequence of characters specific for at least one of: an email address, an alphanumeric or numeric code, and a Uniform Resource Locator (URL).

4. The method of claim 1, wherein the specific contextual definition represents a definition of the textual data elements as pertaining to a "named entity" category.

5. The method of claim 1, wherein each one of the textual data blocks comprises textual data elements arranged in at least one line; and the method further comprises preliminarily classifying each one of the textual data blocks by pertinence to the at least one class based on a length of the at least one line of the textual data elements.

6. The method of claim 1, wherein the preprocessing procedure further comprises embedding each preprocessed tokenized version of the textual data blocks into a vector space;
   wherein each one of the textual data blocks represents a paragraph of an email and the textual data elements represent words.

7. The method of claim 6, wherein embedding each preprocessed tokenized version of the textual data blocks into a vector space comprises creating a vector representation of each textual data element based on a term frequency-inverse document frequency (TF-IDF) measure.

8. The method of claim 1, wherein each one of the textual data blocks represents a paragraph of an email and the textual data elements represent words.

9. The method of claim 1, wherein each one of the textual data blocks represents an email section of an email.

10. A system for classifying textual data blocks, the system comprising: a non-transitory memory device, wherein modules of instruction code are stored, and at least one processor associated with the memory device, and configured to execute the modules of instruction code, whereupon execution of said modules of instruction code, the at least one processor is configured to:
- receive textual data blocks in an original version, each of the textual data blocks comprising a plurality of textual data elements;
- perform a preprocessing procedure on each of the textual data blocks in the original version, wherein the preprocessing procedure comprises:
  - replacing, for each of the textual data blocks, each of the textual data elements characterized by presence of a specific character or sequence of characters with a respective character-based token to generate a first partial tokenized version of the respective textual data block;
  - replacing, for each first partial tokenized version of the textual data blocks, each of the first partial tokenized versions further characterized by a specific contextual definition with a respective context-based token to generate a second partial tokenized version of the respective first partial tokenized first; and
  - replacing, for each second partial tokenized version of the textual data blocks, each of the second partial tokenized versions further characterized by pertinence to at least one specific part-of-speech (POS) category with a respective POS token, thereby obtaining, for each of the textual data blocks, the textual data block in a preprocessed tokenized version of the respective textual data block;
- form a training dataset comprising the textual data blocks in the preprocessed tokenized version labeled with an indication of pertinence to at least once class indicative of an email signature block;
- train a machine learning-based (ML-based) model to classify textual data blocks by pertinence to the at least one class, based on the training dataset, wherein the ML-based model comprises an artificial neural network;
- receive a new textual data block in an original version, the new textual data block comprising a plurality of textual data elements and performing the preprocessing procedure to obtain, for the new textual data block, the new textual data block in the preprocessed version;
- perform machine learning, using the trained ML-based model, on the new textual data block in the preprocessed tokenized version to classify the new textual data block by pertinence to the at least one class.

11. The system of claim 10, wherein the at least one specific POS category is a "proper noun" category; and the preprocessing procedure further comprises defining the textual data elements as pertaining to a "proper noun" category.

12. The system of claim 10, wherein the specific character or sequence of characters are a character or sequence of characters specific for at least one of: an email address, an alphanumeric or numeric code, and a Uniform Resource Locator (URL).

13. The system of claim 10, wherein the specific contextual definition represents a definition of the textual data elements as pertaining to a "named entity" category.

14. The system of claim 10, wherein each one of the textual data blocks comprises textual data elements arranged in at least one line; and the at least one processor is further configured to preliminarily classify each one of the textual data blocks by pertinence to the at least one class based on a length of the at least one line of the textual data elements.

15. The system of claim 10, wherein the preprocessing procedure further comprises embedding each preprocessed tokenized version of the textual data blocks into a vector space;
  wherein each one of the textual data blocks represents a paragraph of an email and the textual data elements represent words.

16. The system of claim 10, wherein embedding each preprocessed tokenized version of the textual data blocks into a vector space comprises creating a vector representation of each textual data element based on term frequency-inverse document frequency (TF-IDF) measure.

17. The system of claim 10, wherein each one of the textual data blocks represents a paragraph of an email and the textual data elements represent words.

18. The system of claim 10, wherein each one of the textual data blocks represents an email section of an email.

* * * * *